United States Patent [19]

Sepp et al.

[11] Patent Number: 4,731,879
[45] Date of Patent: Mar. 15, 1988

[54] REMOTE DATA MONITORING SYSTEM

[75] Inventors: Gunther Sepp, Ottobrunn; Anton Harasim, Taufkirchen, both of Fed. Rep. of Germany

[73] Assignee: Messerschmitt-Boelkow-Blohm GmbH, Munich, Fed. Rep. of Germany

[21] Appl. No.: 637,411

[22] Filed: Aug. 3, 1984

[30] Foreign Application Priority Data

Aug. 5, 1983 [DE] Fed. Rep. of Germany ....... 3328335

[51] Int. Cl.$^4$ .............................................. H04B 9/00
[52] U.S. Cl. ................................................... 455/605
[58] Field of Search ............... 455/604, 605; 356/152; 343/6.5 R, 6.5 SS; 342/45, 54

[56] References Cited

U.S. PATENT DOCUMENTS

| 3,675,989 | 7/1972 | Pietsch et al. | 455/605 |
|---|---|---|---|
| 3,989,942 | 11/1976 | Waddoups | 455/605 |
| 4,096,380 | 6/1978 | Eichweber | 455/605 |
| 4,131,791 | 12/1978 | Lego, Jr. | 455/605 |
| 4,134,008 | 1/1979 | de Corligu et al. | 455/604 |

FOREIGN PATENT DOCUMENTS 3113154 12/1982 Fed. Rep. of Germany ...... 455/604

*Primary Examiner*—Joseph A. Orsino, Jr.
*Attorney, Agent, or Firm*—W. G. Fasse; D. H. Kane, Jr.

[57] ABSTRACT

The present remote data monitoring system employs a laser and a modulated retroreflector for the remote data monitoring of hard to access spaces, targets etc., in combination with an arrangement for a simultaneous friend-or-foe identification, and in combination with devices for the protection against detection and against interrogation of a friend by an enemy laser. In this system, a liquid crystal modulator of special construction depending on the purpose and structure of the system, is arranged in front of a retroreflector and modulated by the respective information. The information is interrogated by a spatially distant laser station by directing a laser beam onto the retromodulator, whereby the information is retroreflected and simultaneously modulated.

30 Claims, 10 Drawing Figures

$\Delta_\varepsilon = \varepsilon_\parallel - \varepsilon_\perp$

REMOTE DATA MONITORING SYSTEM

FIELD OF THE INVENTION

The invention relates to a remote data monitoring system for the remote control of targets and remote monitoring of spaces including a simultaneous identification of friend-or-foe (IFF).

DESCRIPTION OF THE PRIOR ART

Heretofore, remote data monitoring or controlling systems have been produced, installed and used as so-called wire-connected or wire-bound arrangements or systems. The installation of such known systems not only poses considerable difficulties, it is also easy to locate these systems and to jam or interfere with their operation. Even radio or HF-systems for this purpose are easily located or jammed.

A laser system for steering flying bodies with a modulated reflector has also become known from German Patent Publication No. 2,533,647.4-22 wherein a laser beam is reflected back to a transmitter by a retroreflector attached to a flying body. Information for steering the flying body is transmitted from the retroreflector to the transmitter location by the arrangement of a modulator in front of the retroreflector. The transmission of the modulator is controlled by the information to be transmitted.

In another prior art arrangement as disclosed in U.S. Pat. No. 4,134,008 this method is used for transmitting an IFF-response code to an IFF-interrogation code received at the location of the retroreflector for identifying the response code. Kerr or Pockels cells, or PLZT ceramics (lead-lanthanum-zirconium-titanium) are used in the system of U.S. Pat. No. 4,134,008 for modulating the retroreflector signal. These modulators require high operating voltages, besides they are either very costly or they allow only a relatively low modulation frequency. Another disadvantage is seen in that only an information transmission is possible without a simultaneous IFF-response, or only an IFF-response is possible. Moreover, the retromodulator may be located and interrogated by a foe's search laser beam at any time, or at least during an information or IFF-code transmission. Known systems are also not equipped with any means against interference in the transmission due to laser beam scintillation caused by atmospheric turbulence.

OBJECTS OF THE INVENTION

In view of the above it is the aim of the invention to achieve the following objects singly or in combination:

to provide a remote data monitoring or controlling system for detecting distant bodies or for monitoring and observing space, which system avoids the described disadvantages, so that it is easy to install and especially difficult to locate;

to construct such a system so that it is capable to carry out a simultaneous friend-or-foe identification during the information transmission;

to use in the system a simple modulator yet capable of modulating a laser beam in a relatively wide frequency band;

to construct the system so that it may be operated by a low voltage, low current power supply, such as a battery power supply for a compact, mobile system; and to construct the system so that it is difficult or even impossible for a foe to interrogate the system.

SUMMARY OF THE INVENTION

The above objects have been achieved according to the invention in a remote data communication and monitoring or controlling system by means of a laser and a modulatable retroreflector for the remote interrogation of information from space or targets with a simultaneous friend-or-foe identification (IFF), wherein a control laser transmitter-receiver cooperates with a retroreflector which can be activated only by a laser transmission beam which carries a predetermined IFF-code provided by an IFF-code generator of the laser transmitter-receiver. The IFF-code generator in the transmitter section of the transmitter-receiver drives a wavelength stabilized semiconductor laser. The laser beam of the semiconductor laser is directed onto the retroreflector, wherein the received information is supplied to a retromodulator having an interference filter. The returned or reflected beam from the retroreflector is detected in the laser receiver section of the transmitter-receiver, wherein it is filtered, and then delivered to a control device and a demodulator with a converter or transducer. Further features of the invention are also set forth in the dependent claims.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Locating and steering systems operating with lasers allow for an exceptionally effective way of identifying friend-or-foe (IFF). In the radar methods customary until now, the signal sent out to a potential target is encoded in an appropriate manner. Friendly targets are equipped with a special radar transponder which recognizes the signal and then radiates by radio a prescribed identification signal, whereby the response usually occurs in a non-directed manner, and may then also be located by a foe's monitoring receiver.

For performing so-called laser locating methods friendly targets are equipped with optical IFF-receivers or rather transponders and retroreflectors. When a locating or guidance beam strikes the supposed target, it is also automatically interpreted as a simultaneous IFF-interrogation. The IFF-receiver decodes the code signal in the laser beam of the transmitter, and then controls a modulator, in this case by means of an answer code generator. This modulator is located in front of a retroreflector and is only permeable or transmissive in synchronization with the answer code pattern. Consequently the ground station, which ranges the supposed target, automatically receives the IFF-code signal, while the retroreflector cannot respond to possible enemy laser systems.

The back-scattered laser signal is always identifyable in a definite manner since due to the retroreflection it is stronger by several orders of magnitude than a signal scattered back from a diffusely reflecting target. Additionally, due to the exceptionally small divergence of the retroreflector beam (<0.1 mrad), the laser signal can only be received by the ground station itself, which in fact considerably simplifies maintaining the IFF-code secret.

Figure 1:
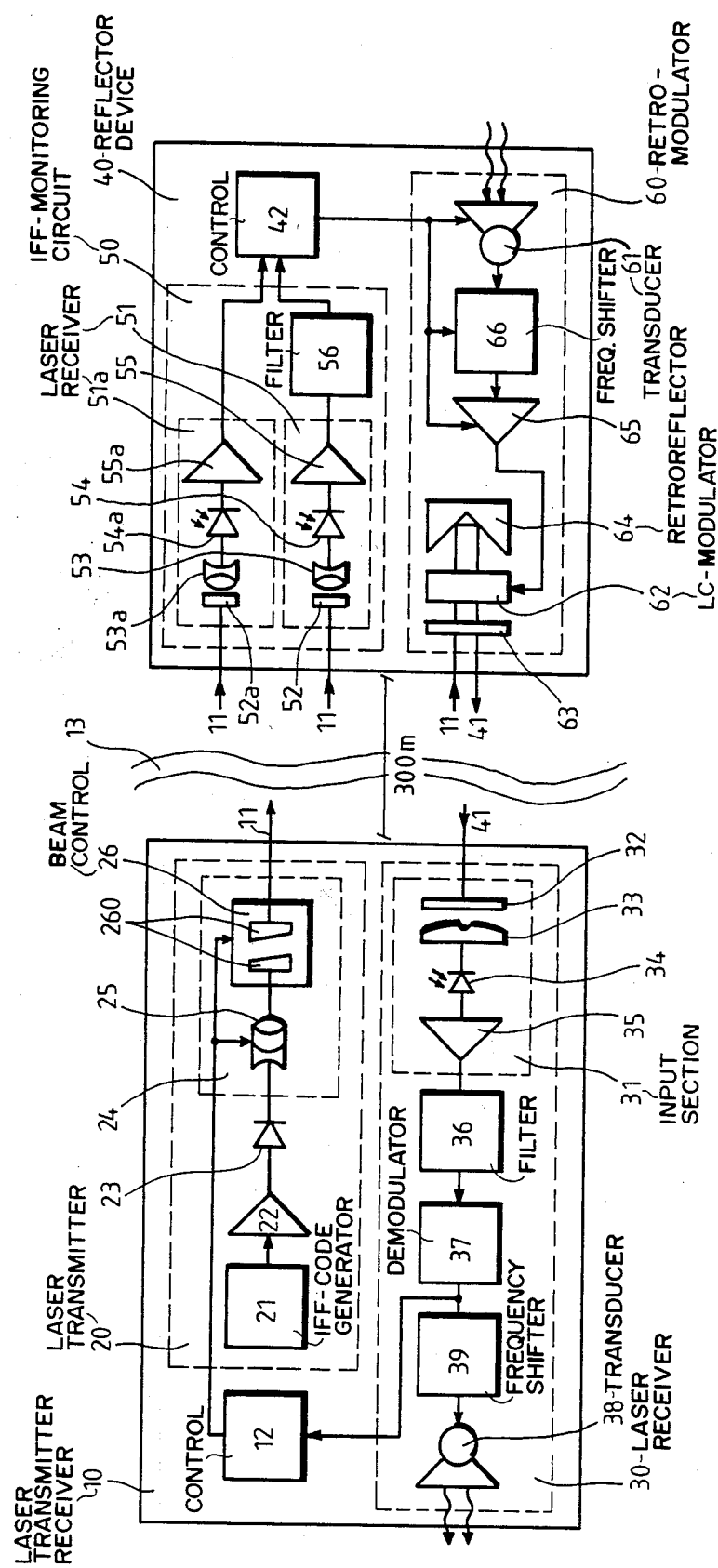
FIG. 1 is a block circuit diagram of the present system including a laser transmitter-receiver cooperating withe a retroreflector for providing a remote monitoring ability in combination with a simultaneous IFF-capability.

FIG. 1 shows in a block circuit diagram the construction of an example embodiment of the present remote data monitoring system having a simultaneous friend-or-foe identification capability in addition to the data monitoring. The system comprises a laser transmitter-receiver 10 and a laser transmitter 20 for producing a laser transmission beam 11 and a laser receiver 30 for receiving a reflected beam 41. The transmission beam 11 is modulated with the IFF-code by means of an IFF-code generator 21 connected to an amplifier 22, which in turn is operatively connected to a semiconductor laser 23 which is wavelength-stabilized by a conventional Peltier temperature regulation or control not shown. The laser transmission beam 11 is shaped by a target aquisition and tracking device 24 through zoom transmission optics 25 in response to a control device 12 of conventional construction and capable to control the beam divergence and the transmission direction. The beam 11 may also pass through a beam control member or beam controller 26, comprising, for example, position controllable optical wedges 260, also controlled in their position by the control device 12. Further details regarding the beam controller 26 are set forth below. The laser transmission beam 11 is directed through the free atmosphere 13 onto the reflector device 40. A reflected laser beam 41 is received by the laser receiver 30 having an input section 31 including an interference filter 32, receiver optical means 33, a photodetector 34 and an amplifier 35. The receiver 30 further comprises an IFF-code filter 36 connected to the amplifier 35 of the receiver input section 31, a demodulator 37 connected with its input to the IFF-code filter 36 and with its output to the control device 12 and to a transducer 38 such as a display screen, preferably through a frequency shifter 39 to be described in more detail below.

The information to be transmitted to the receiver 30 with the reflected beam 41 is modulated onto the beam 41 in the retromodulator 60 by a liquid crystal modulator 62 under the control of the conventional control device 42 supplying the information to a transducer 61, for instance a microphone or a TV camera. The output of the transducer 61 passes to an amplifier 65 preferably through a frequency shifter 66 for activating the LC-modulator 62, which is located between a retroreflector member 64 and an interference filter 63. A reflecting foil or a triple reflecting mirror may serve as the retroreflector 64. The frequency shifter 66 and the amplifier 65 are under the control of the control device 42 just as the transducer 61 is also under the control of the control device 42.

In order to avoid an impairment of the transmission by atmospheric turbulence or disturbences in the frequency range 0 to about 1 kHz, the above mentioned frequency shifters 66 and 39 may be employed to shift the frequency band to be transmitted by approximately 1 kHz upwardly in the retromodulator 60 by the shifter 66, and then shift the frequency band back again by the shifter 39 in the receiver 30.

If a data transmission is to take place, the control device 12 initiates a search phase, in which the zoom transmitter optics 25 produces a relatively divergent laser transmission beam 11, which scans a space sector predetermined by the beam controller 26. The reflector device 40 is located within this space sector. After the first detection of the laser reception beam 41, the control device 12 starts the target tracking phase by setting the zoom transmitter optics 25 to the least possible divergence of the laser transmission beam 11. Additionally, the control device 12 adjusts the beam controller 26, for example by continuously scanning a very small space sector around the reflector device 40, so that the intensity of the laser reception or reflected beam 41 is always at a maximum.

These measures or features automatically locate and track even a moving reflector device 40 of a target. These features also make it much more difficult for an enemy laser receiver to locate the laser transmission beam 11 during the transmission. This is true because the divergence of the laser transmission beam 11 may now be made so small that the laser transmission beam 11 during the tracking phase is covered almost completely or at least to a large extent by the reflecting arrangement, provided the distance between the transmitter-receiver 10 and the reflector device 40 is not too large in this respect. In order to optimize this effect, it is advantageous to position the effective aperture of the retromodulator 60 in the center of the disk-shaped reflector device 40. Despite the very small beam divergence, the continuous readjustment of the laser transmission beam 11 enables a remote data transmission, for example, from a reflector device 40 attached to a body moving in a space, to a laser transmitter-receiver 10 located in a parked passenger vehicle occupied by moving persons. The locating of the laser transmission beam 11 is limited to a very narrow space angle due to the small beam divergence. Another advantage is seen in that even the locating of any scattering radiation always caused by the atmosphere 13, is very difficult, since the total intensity of the laser beam may be kept small due to the high beam focusing.

The reflector device 40 comprises, as protection against detection and interrogation by an enemy laser system, an IFF-monitoring or alert circuit 50 having two laser receivers 51, 51a each with its interference filter 52, 52a, reception optics 53, 53a, photodetectors 54, 54a and amplifiers 55, 55a. The narrow band interference filter 52 passes the beam 11 from the wavelength-stabilized semiconductor laser 23, whereas the wideband interference filter 52a does not pass this beam 11 but passes radiation of any other wavelength. The same effect may be achieved if a narrow band interference filter 52, which simultaneously acts as a beam splitter, is operatively arranged behind a common reception optical member 53. Such narrow band interference filter 52 then passes the laser light of the beam 11 through to the photodetector 54, but reflects all remaining light to the photodetector 54a due to its function as a beam splitter.

An IFF-code filter 56 is located downstream of the laser receiver 51. The control device 42, which is connected to the output of both receivers 51, 51a thereby recognizes whether the receiver laser beam has the correct wavelength and the correct IFF-code, or whether the reflector device 40 is being hit or interrogated by an enemy locator-laser beam. In the latter case, the retromodulator 60 is deactivated for a certain length of time. Since the transmission of the liquid crystal modulator 62 is minimal in this state, a following even temporary locating is not possible, or may very difficult.

In order to make it more difficult to eventually take a bearing on the laser transmission beam 11 in this case, the control device 12 determines the resulting signal loss or signal absence which is of longer duration, interprets this loss or absence as a deactivation of the liquid crystal modulator 62 by the IFF-monitoring or alert circuit 50, and then interrupts the laser transmission beam 11 for a corresponding length of time.

The IFF-code generator 21 produces a periodically modulated IFF-code signal having an upper limit or boundary frequency which is large compared to the fundamental or base frequency corresponding to the modulation period of the moudlator 62. The base frequency itself is the same as the upper boundary or limit frequency of the liquid crystal modulator 62, whereby it is possible, that the lower frequency band from 0 or from 1 kHz after a frequency change or shift by means of the frequency shifter 66, up to the limiting boundary frequency of the liquid crystal modulator 62 can be used for an information transmission, without disturbance of the information transmission by the upper frequency band carrying the IFF-code. Thus, the situation is eliminated in which there is not any laser beam or intensity falling on the reflector device 40 during a period duration corresponding to the base frequency of the liquid crystal modulator 62. Accordingly, the situation in which there is not any retroreflection is also eliminated during such periods.

The control device 42 now recognizes the IFF-code signal within one modulation period or within a few modulation periods, or even within less than one modulation period. The control device carries out this test continuously and activates or deactivates for a certain length of time the retromodulator 60 or the liquid crystal modulator 62 and the other components having a high power consumption. This feature achieves considerable reduction in the required power supply during the unused time. Thus, the power supply may be achieved by a battery. Additionally, the interrogation of data and of the IFF-code from the reflector device 40 by an enemy laser system during a regular data transmission is prevented. The interrogation of the IFF-code by an enemy laser is especially eliminated or prevented because the IFF-code signal cannot be transmitted by the liquid crystal modulator 62 due to the high bandwidth of the IFF-code signal.

It is preferable, in an example embodiment, that the IFF-code generator 21 is a quartz-stabilized oscillator and that the IFF-code filters 36 and 56 are band filters with a characteristic corresponding to the frequency of the oscillator, whereby the bandwidth of the filters 36 and 56 corresponds to the limit frequency of the liquid crystal modulator 62. The signal-to-noise ratio of the data recovery in the laser receiver 30 is maximized by the IFF-code filter 36.

A pulse code modulation (PCM), for instance in the form of a pseudo-noise distribution, may alternatively be used as the IFF-code signal.

Figure 2:
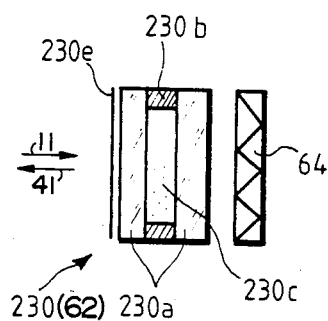
FIG. 2 is a schematic cross-section through a liquid crystal cell for use as a modulator in the retroreflector.

FIG. 2 shows an example of a liquid crystal cell 230 for use as a modulator 62 in the retromodulator 60 of FIG. 1, whereby the system may be optimized. Such a liquid crystal cell 230 comprises two or several glass plates 230a arranged behind one another and separated from one another by means of spacers 230b. These glass plates 230a are coated with conducting and transparent electrodes. A layer 230c of a liquid crystal material is placed into the interspace or interspaces between the glass plates. The layer 230c comprises a nematic liquid crystal having as high an anisotropy as possible in the index of refraction, and a cholesterinic doping material or liquid of which the concentration "c" is given by the equation $$c \approx \frac{k \cdot n}{\lambda}$$

wherein:
  n = the mean index of refraction of the liquid crystal,
  λ = wavelength at which maximum scattering or absorption should occur,
  k = characteristic constant of the cholesterinic doping material or liquid.

The cholesterinic doping of the nematic liquid crystal achieves a short switch-off time. The turn-on or switch-on time is influenced by the applied voltage level and by the thickness of the liquid crystal layer. In the present example embodiment described, a thickness of 6 μm has been used for the layer 230c in FIG. 2, whereby the voltage levels can remain in the range of the CMOS-voltages. A liquid crystal cell 230 constructed as just described, operates in the scatter mode and without any polarizers. The scattering is at a maximum at a given wavelength if the above equation is satisfied. The usable wavelength range is limited by the optical anisotropy of the liquid crystal substance. Outside of this wavelength range the modulation is very weak, or no longer detectable. Therefore, the locatability of the retromodulator 60 is practically impossible for an outsider or enemy, especially if additionally the front face of the liquid crystal cell or element 230 is provided with a transparent conductive electrode 230e, which is conductively connected to a metal shielding or housing for grounding and thus preventing an electromagnetic radiation.

In the absence of a control voltage, or with small control voltages below a threshold voltage, the incoming light is strongly scattered, so that a retroreflector 64 arranged behind the liquid crystal modulator 62 does not become effective. If a voltage, which barely exceeds the threshold voltage $U_{10}$ (FIG. 3), is applied to the liquid crystal cell, the cell becomes almost transparent. Between the two states $U_{10}$ and $U_{90}$ a nearly linear section L exists, which is used for the modulation of analog voltages.

Figure 3:
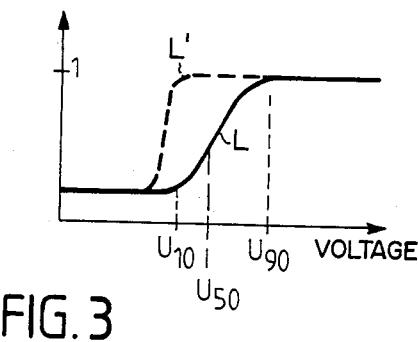
FIG. 3 is a transmission-voltage diagram of a liquid crystal modulator cell of FIG. 2.

In general, cholesterinicially doped liquid crystal substances exhibit a hysteresis behavior which adversely affects the modulation. However, traversing the dashed line leg L' in FIG. 3 is avoided by using only about 90% of the linear part L of the characteristic curve. An activation voltage larger than $U_{90}$ is avoided in the circuit shown in FIG. 4 by an automatic gain control AGC 360. The operating point $U_{50}$ of the liquid crystal modulator 62 is adjusted in FIG. 4 by means of a square-wave oscillator 340. If one liquid crystal cell 230 is not sufficient to achieve a high depth of modulation, then several of such cells 230 may be arranged in a row behind one another.

Figure 4:
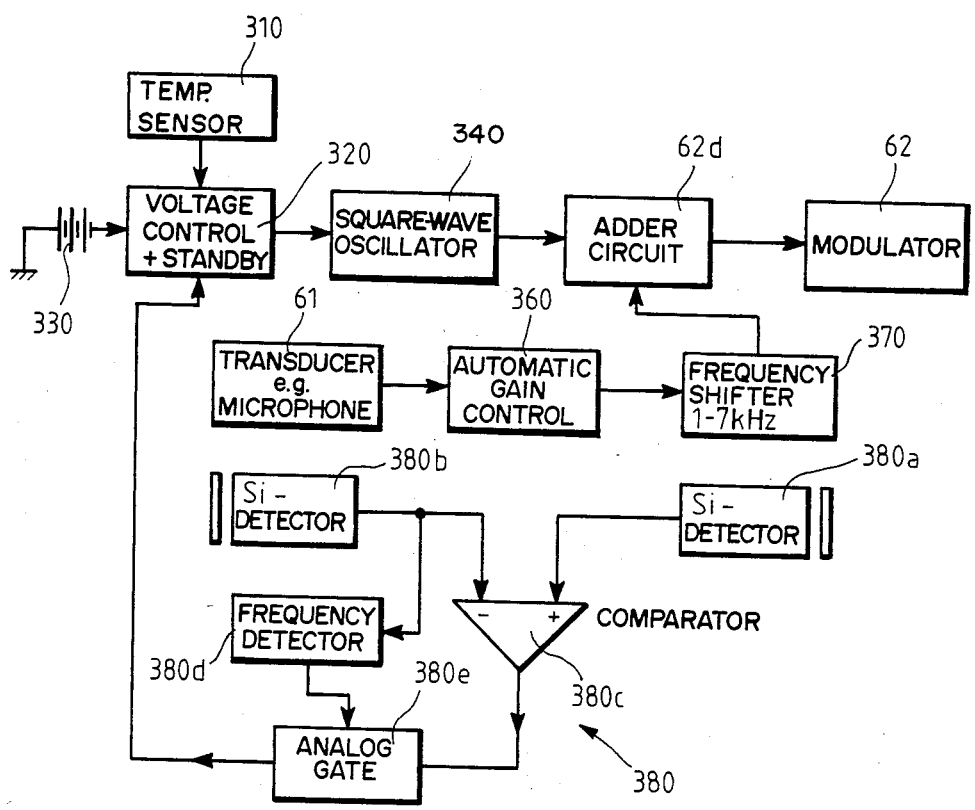
FIG. 4 is a block circuit diagram of an example embodiment of a device for protection against detection and a device for increasing the operating temperature of the modulator in the retroreflector.

The circuit arrangement 380 of FIG. 4 shows an example embodiment of a circuit for protecting the liquid crystal modulator 62 of FIG. 1 against detection by search devices. The protecting circuit 380 comprises silicon detectors 380a, 380b with respective optical input means. The outputs of the detectors 380a and 380b are connected to a comparator 380c. A frequency detector 380d is connected to the output of at least one silicon detector 380b and to an analog gate 380e, which is also connected to the output of the comparator 380c for identifying the adjustable and high frequency pulse frequency of the transmitting laser beam received by the detectors 380a and 380b and for activating the modulator 62. Furthermore, an arrangement for increasing the working temperature range of the liquid crystal modulator 62 is provided in the form of a temperature sensor 310 connected to the voltage regulator and power supply standby 320 including an electrical battery 330. This arrangement is effective on the voltage supply, or more specifically the temperature responsive voltage regulator 320 controls a square-wave oscillator 340 which in turn activates through an adding circuit 62d the liquid crystal modulator 62 to thereby displace the operating point $U_{50}$ of the liquid crystal modulator 62 proportionally to the respective temperature. The adding circuit 62d has a further input connected to a frequency shifter 370 which is responsive to the transducer 61, such as a microphone, through an automatic gain control circuit 360 mentioned above.

Figure 8:
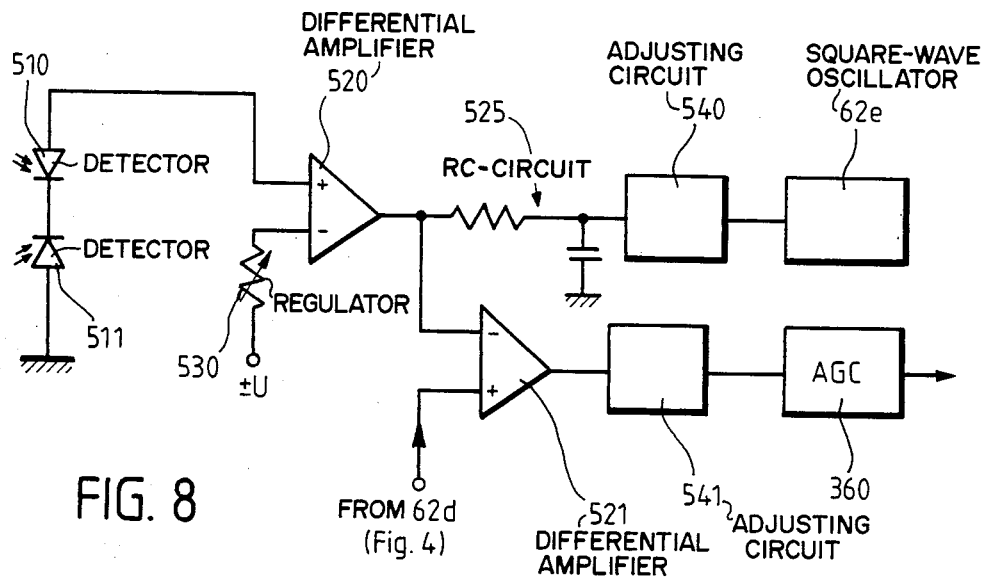
FIG. 8 is a block circuit diagram of a circuit for improving the harmonic distortion factor of the liquid crystal modulator.
Figures 9, 10:
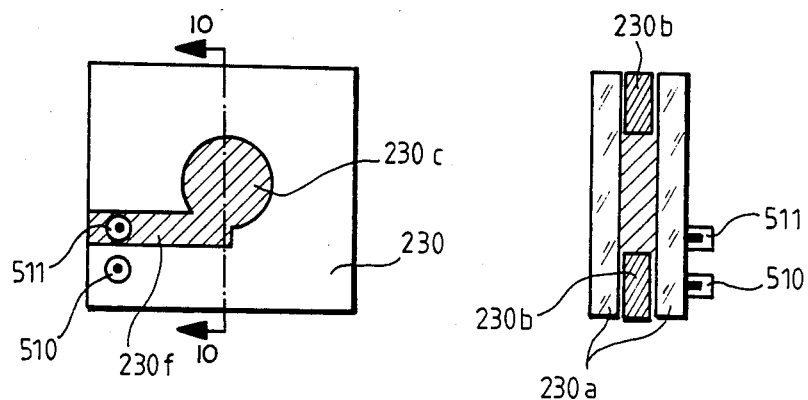
FIG. 9 is a schematic plan view of a liquid crystal element with two logarithmically sensitive photodetectors for use in FIG. 8 for improving the harmonic distortion factor of the liquid crystal modulator.
FIG. 10 is a sectional view along section line 10—10 in FIG. 9.

FIG. 8 shows a feedback circuit for improving the harmonic distortion factor of the liquid crystal modulator 62. Two photodetectors 510, 511 with logarithmically linear sensitivity/voltage characteristics are arranged directly next to the retroreflector 64 shown in FIG. 1 at the liquid crystal modulator 62. The photodetector 511 is located in front of a liquid crystal modulated region, for example a filling hole 230f, whereas the photodetector 510 is located outside of a region filled with a liquid crystal mixture 230f, please see FIGS. 9 and 10. The modulated radiation received by the photodetectors 510, 511 may originate from the laser transmission beam 11, or from ambient light, and is supplied to a differential amplifier 520 provided with an input control member 530, such as a variable resistor. The output of the differential amplifier 520 is smoothed by an RC-element 525, so that a voltage is supplied ideally corresponding to a mean transmission of the liquid crystal modulator 62. The two photodetectors 510, 511 which are connected in opposition produce a voltage at the input of the differential amplifier 520, which corresponds to the quotient of the received light. This quotient value is adjusted to the operating point $U_{50}$ by means of the input control member or regulator 530. Any temperature displacement of the operating point is automatically readjusted by the adjusting circuit 540, which controls the square-wave oscillator 62e. The modulated brightness signal at the output of the differential amplifier 520 is also compared to the activation signal of the liquid crystal modulator 62 (see FIG. 4) in a further differential amplifier 521. Any deviation from a rated or given value supplied from 62d, is corrected by a signal adjusting circuit 541 and supplied to the AGC 360 connected as in FIG. 4, thereby closing the feedback loop. With this feedback control any nonlinearities in the characteristic curve of the liquid crystal modulator 62, that might possibly occur, may be compensated, whereby its harmonic distortion factor may be noticeably reduced.

The usable information signal from the output of the transducer 61, such as a microphone 61, is amplified by means of the variable gain amplifier 360 to the extent that the maximum output amplitude does not exceed a value $U_{90}$ minus $U_{10}$ (FIG. 3). This signal is then supplied to the frequency shifter 370 which displaces the transmission frequency from 0–6 kHz to 1–7 kHz, in order to avoid interference in the transmission through the atmosphere, which is especially marked in the frequency range under 1 kHz. The biasing squarewave signal from the oscillator 62a and the frequency displaced usable signal from the frequency shifter 370 are applied through the adding circuit 62d to the liquid crystal modulator 62.

For increasing the bandwidth in a further example embodiment, a spatial mulitplexing of the liquid crystal modulator 62 is provided by using several modulator cells or elements in a row so that the resulting modulator corresponds to an array detector comprising n times n elements. Each segment of the array then transmits the maximum frequency band, which leads to an $n^2$-fold higher total bandwidth. However, in this case, a rotational adjustment means (not shown) would be required for the receiver array detector.

Figure 5:
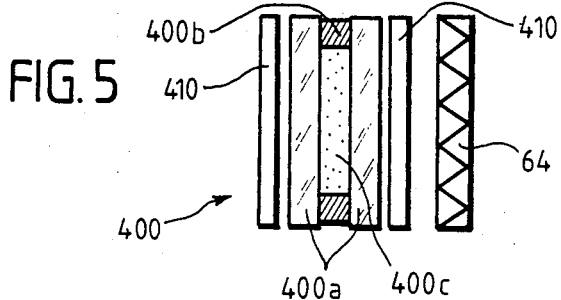
FIG. 5 is a cross-section through a liquid crystal element for transmitting television picures.

FIG. 5 illustrates a liquid crystal element or cell 400 suitable for the transmission of TV pictures with the present system. Instead of using a nematic-cholesterinic mixture in the liquid crystal cell as in FIG. 2, a ferroelectric liquid crystal mixture 400c is used between two glass plates 400a spaced by spacers 400b in the cell 400 of FIG. 5. Additionally, polarizers 410 are positioned in front of and behind the cell 400. The glass plates 400e are also coated with conducting, transparent electrodes.

Figure 6:
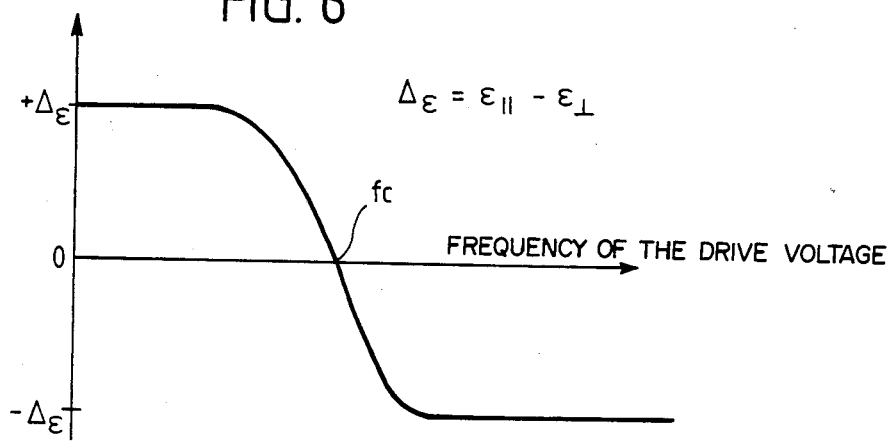
FIG. 6 illustrates, as a function of the drive voltage frequency, the dielectric anisotropy $\Delta\epsilon$ of a two frequency mixture of two liquid crystal materials each having a different frequency response characteristic, in a liquid crystal element of FIG. 5.
Figure 7:
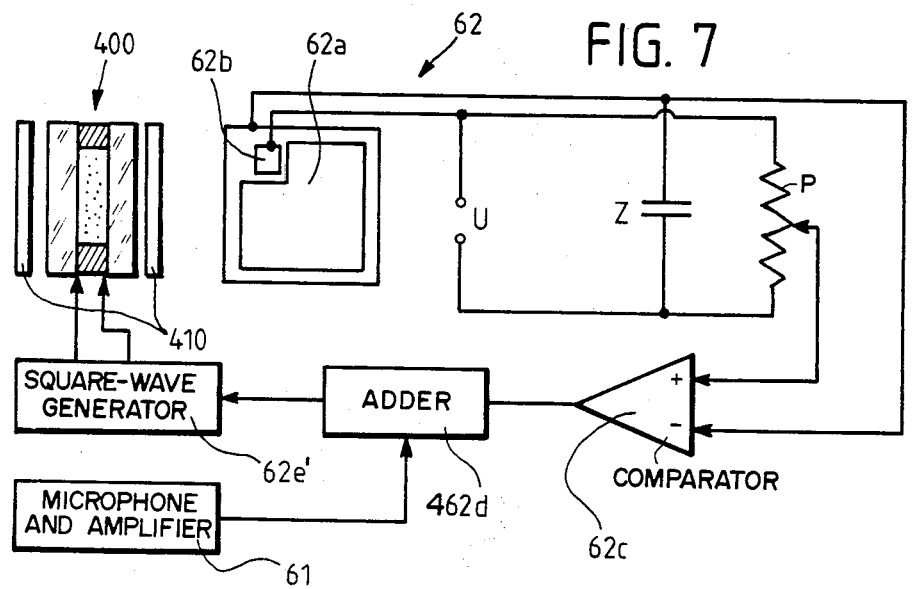
FIG. 7 is a block circuit diagram of a sensor circuit for sensing the output of a liquid crystal element with a two frequency mixture operating as a liquid crystal modulator.

FIG. 6 illustrates the possibility of using a frequency modulation of digital driving voltages (0 and 1) for the the liquid crystal cell 400, instead of an amplitude modulation. However, so-called two frequency liquid crystal mixtures must be used for this purpose. The frequency dependent dielectric anisotropy $\Delta\epsilon$ of the mixture is the difference $\epsilon_\|$ minus $\epsilon_\perp$ wherein $\epsilon_\|$ is the parallel component and $\epsilon_\perp$ is the perpendicular component of the dielectric anisotropy $\Delta\epsilon$. FIG. 6 shows the characteristic pattern of $\Delta\epsilon$ as a function of the frequency of the drive voltage. The transition between $+\Delta\epsilon$ and $-\Delta\epsilon$ is employed as the working point which however has been very temperature dependent in previously known two frequency mixtures. Therefore, a sensor circuit is provided as shown in FIG. 7. This sensor circuit only uses a small portion 62b of the modulator surface area 62a for recognizing the instantaneous transition range. The surface of this small portion 62b is approximately 1/100th of the modulator surface 62a and is not conductively connected to the larger surface area 62a.

In the example embodiment of FIG. 7, an intensity modulation of the light is performed, however, with the difference that a frequency modulation instead of an amplitude modulation of the control or drive voltage is carried out. An adjustable temperature sensing circuit Z is connected to the electrodes of the large and small surface portions of the moudlator 62 embodied by the cell 400, and to one input of a comparator 52c. The other input of the comparator 62c is connected to the larger surface electrode of the modulator 62. The output of the comparator 62c is connected to the adder 462d for driving the cell 400 through an adding circuit 62d and a square-wave generator 62e'.

The example embodiment of FIG. 7 entails several advantages. One advantage is that the light modulation may take place over a large wavelength range, which is determined by the bandwidth of the polarizer. Another advantage is seen in that instead of analog circuit components only digital circuit components and compatible microprocessors can be used in FIG. 7. In the off-state the retromodulator is dark and therefore not recognizable or locatable. Yet another advantage is the larger distance range that may be covered with the same laser power, due to the larger modulation factor or stroke.

Other advantages of the present system are seen in that it is difficult to locate, that it is interference protected, that it provides an acoustic remote monitoring of hard to access locations, and that it has a simultaneous friend-or-foe identification capability. The system additionally has many different uses. For example, the system may be used for locating or rather ranging and for data transmissions in military or communication purposes on earth or in outer space. The system is also suitable for control and regulation, for instance, in the vacuum technology, and also in the nuclear reactor technology. This is so because any form of information, not only acoustic or visual information, may be used for controlling the liquid crystal modulator 62.

Although the invention has been described with reference to specific example embodiments, it will be appreciated, that it is intended to cover all modifications and equivalents within the scope of the appended claims.

What is claimed is:

1. A remote data monitoring system for interrogating information from a remote interrogated location, comprising laser transmitter-receiver means (10) at an interrogating location, to transmit a laser beam (11) comprising upper and lower frequency bands, and retroreflector means (40) at said remote interrogated location, said laser transmitter-receiver means (10) comprising a laser transmitter section (20) including laser transmitter means (23, 24, 25, 26) including a semiconductor laser (23) and wavelength stabilizing means as part of said semiconductor laser (23) for stabilizing the wavelength of said semiconductor laser (23) and an IFF-code generator means (21) operatively connected to said laser transmitter means for modulating said upper frequency band onto said laser beam (11) transmitted by said laser transmitter means (23, 24, 25, 26), said laser transmitter-receiver means further comprising a laser receiver section (30) for receiving a reflected beam (41) comprising upper and lower frequency bands, said receiver section (30) including laser receiver means (31, 32, 33, 34, 35), an IFF-code demodulator (37) and first control means (12) connected to said IFF-code demodulator (37) and to said laser transmitter means for controlling the laser transmitter means in accordance with received information, said laser receiver section (30) further comprising transducer means (38) connected to said IFF-code demodulator (37) for providing an information output, said retroreflector means (40) comprising a retroreflector section and means including an IFF-monitoring circuit (50) for fully activating said retroreflector section only in response to a transmitted laser beam (11) modulated at said upper frequency band with an IFF-code and for fully deactivating said retroreflector section in response to a foe laser interrogation, information sensing means (61) for sensing information at said remote location, and a retroreflector (64), amplifier (65) and liquid crystal reflector modulator means (62) arranged for modulating said lower frequency band of said laser beam (11) in response to information sensed by said information sensing means (61) at said remote location to produce said reflected beam (41) simultaneously carrying information containing signals in said lower frequency band and IFF-code signals in said higher frequency band, said semiconductor laser (23) and said liquid crystal reflector modulator means (62) requiring a low voltage, low current power supply.

2. The system of claim 1, wherein said laser receiver section comprises an interference filter (32), and wherein said retroreflector section also comprises an interference filter (63).

3. The system of claim 1, wherein said liquid crystal reflector modulator means (62) includes two or several glass plates (230a) separated from one another by spacers (230b) to form at least one interspace between two glass plates (230a), and a liquid crystal mixture (230c) in said interspace, said liquid crystal mixture comprising a nematic liquid crystal compound having a high optical anisotropy and including a cholesterinic doping liquid having a concentration $$c \approx \frac{k \cdot n}{\lambda}$$

; wherein k is a characteristic constant of the cholesterinic doping liquid, n is the index of refraction of said nematic liquid crystal, and λ is a wavelength at which maximum scattering occurs.

4. The system of claim 1, wherein said liquid crystal reflector modulator means (62) includes two or several glass plates (230a, 400a) separated from one another by spacers (230b, 400b) to form at least one interspace between two glass plates, and a ferro-electric liquid crystal mixture (400c) in said interspace, said liquid crystal modulator further comprising polarizer means (410) arranged in front of and behind said glass plates.

5. The system of claim 1, wherein said retroreflector means (40) comprise in addition to said IFF-monitoring circuit (50), a sensor means for converting sensed information into a modulating signal, and an interference filter (63) located in front of said retroreflector (64), wherein said laser receiver station (30) comprises a laser receiver (31) with an interference filter (32) for filtering out interfering signals from a received signal, reception optics (33) for receiving a filtered signal that has passed through said interference filter (32), a photo-detector (34) for converting said filtered signal into a respective electrical signal, an amplifier (35) for amplifying said electrical signal, an IFF-code filter (36) for filtering an output signal from said amplifier (35), said IFF-code demodulator (37) demodulating a signal from said IFF-code filter (36), said first control means (12) being responsive to said IFF-code demodulator (37) for controlling said laser transmitter means.

6. The system of claim 1, further comprising a target acquisition and tracking arrangement (24) including zoom transmission optics (25) and a beam control member (26), wherein during a target acquisition phase, said control means (12) control said zoom transmission optics (25) of said target acquisition and tracking arrangement (24) for setting the transmitted laser beam (11) to a large divergence, said first control means (12) also controlling said beam control member (26) for performing a search mode, in which the transmitted laser beam (11) is scanning a predetermined space sector.

7. The system of claim 6, wherein after the first detection of a reflected laser beam (41), said control means (12) initiates a target tracking phase by setting said zoom transmission optics (25) to the smallest possible divergence of the transmitted laser beam (11) and by controlling said beam control member (26) for maximizing the intensity of the reflected laser beam (41).

8. The system of claim 1, wherein said IFF-monitoring circuit for fully activating said retroreflector section comprises a laser receiver (51), an interference filter (52) connected to an input of said laser receiver (51), said interference filter (52) having a narrow band corresponding to a wavelength band of said laser transmitter means, reception optics (53) cooperating with said interference filter (52), a photo-detector (54) connected to said reception optics, an amplifier (55) connected to said photo-detector (54), and an IFF-code filter (56) connected to said ammplifier (55), said activating means including further control means (42) connected with one input to said IFF-code filter (56) for monitoring the output of said IFF-code filter (56) and for activating the retroreflector section (60) including said information sensing means, amplifier means (65) and said reflector modulator means (62) in the form of said liquid crystal reflector modulator means, in response to a signal received by said IFF-monitoring circuit.

9. The system of claim 8, wherein said IFF-monitoring circuit (50) further includes an additional laser receiver (51a) with an additional interference filter (52a) having a wide band width yet not transmitting the wavelength of said laser transmitter means, further reception optics (53a) cooperating with said additional interference filter (52a), an additional photo-detector (54a) cooperating with said further reception optics, and an additional amplifier (55a) connected to said additional photo-detector (54a), said additional amplifier having an output connected to a second input of said further control means (42) for deactivating said retroreflector section for a certain length of time in response to a received signal.

10. The system of claim 9, wherein said first mentioned control means (12), during a target tracking phase interrupts the transmission of the laser beam (11) for a certain length of time corresponding to the deactivation time of said retroreflector section in response to the absence of a reflected laser beam (41) for a certain length of time.

11. The system of claim 1, wherein said liquid crystal reflector modulator means (62) operates at frequencies below or equal to a base frequency and has only a minimal transmission in its off-state, said liquid crystal reflector modulator means (62) further having an upper limit frequency which is the same as said base frequency.

12. The system of claim 11, wherein said IFF-code generator means (21) produces a periodically modulated IFF-code signal having a large band width having upper and lower limit frequencies, whereby the upper limit frequency is large compared to said base frequency of said liquid crystal reflector modulator means (62), and wherein said lower limit frequency is the same as said base frequency of the liquid crystal modulator (62).

13. The system of claim 12, wherein said IFF-monitoring circuit (50) of said activating means is provided for continuously carrying out an identifying test of an IFF-code signal within one period or within a few periods or within less than one period of said base frequency and wherein said activating means comprise a further control means (42) for activating or deactivating the reflector modulator means (62) in response to the test results.

14. The system of claim 1, further comprising first frequency shifter means (66) connected to the output of said information sensing means (61), whereby said first frequency shifter means (66) shifts the frequency band which is to be transmitted by reflection, by about 1 kHz to a higher frequency, and second frequency shifter means (39) coupled to an input of said transducer means (38), whereby said second frequency shifter means (39) correspondingly shifts back the frequency band, which was transmitted by reflection.

15. The system of claim 1, wherein said IFF-code generator means (21) comprise a quartz stabilized oscillator and and IFF-code band filter (35) having a frequency corresponding to the frequency of the quartz stabilized oscillator.

16. The system of claim 1, wherein said information sensing means (61) comprise a microphone, and wherein said transduceer means (38) is a loudspeaker.

17. The system of claim 1, wherein said information sensing means (61) comprise a TV camera, and wherein said transducer means (38) comprise a TV monitor or TV display screen.

18. The system of claim 1, wherein said laser transmitter section (20) comprises laser beam controller means (26) including two motor-driven rotating optical wedge compensators (260) for directing the laser beam.

19. The system of claim 1, wherein said retroreflector (64) comprises a film or foil for reflecting said reflected beam.

20. The system of claim 1, wherein said retroreflector section (60) comprises an effective aperture of said reflector modulator means (62) arranged in the center of said retroreflector having a disk shape.

21. The system of claim 1, wherein said means for fully activating said retroreflector section comprise laser receivers (51, 51a) including a common reception optical member (53) and a narrow band interference filter (52) having a pass frequency corresponding to the wavelength of said laser transmitter means (23), said narrow band interference filter being arranged as a beam splitter.

22. The system of claim 1, wherein said liquid crystal reflector modulator means (62) comprise a liquid crystal mixture, said system further comprising means for modulating the drive or activation voltage for said liquid crystal mixture in said liquid crystal modulator said liquid crystal mixture exhibiting a two frequency characteristic, said modulator means performing an amplitude modulation or performing a frequency modulation of said drive or activation voltage at different times.

23. The system of claim 1, wherein said liquid crystal reflector modulator means (62) comprise a liquid crystal mixture including a nematic liquid crystal, a cholesterinic doping substance, and a dichroic pigment.

24. The system of claim 1, wherein said liquid crystal reflector modulator means (62) comprise a front glass plate provided with a transparent, electrically conducting electrode (230e), which is electrically connected to a metallic shielding or to a metal housing of the retroreflector (40).

25. The system of claim 1, wherein said liquid crystal reflector modulator means (62) comprise a liquid crystal filled region and two logarithmically sensitive photodetectors (510, 511) arranged on the side of said liquid crystal reflector modulator means (62) facing said retroreflector (64) in such a manner that one photodetector is within while the other photodetector is outside of said liquid crystal filled region of said liquid crystal modulator (62), said photodetectors having outputs interconnected in opposition to each other for providing a photodetector output signal, said reflector modulator means (62) further comprising a differential amplifier (520) including an input control member (530) connected to one input of said differential amplifier (520), said photodetector output signal being supplied to another input of said differential amplifier.

26. A remote data monitoring system for interrogating information from a remote interrogated location, comprising laser transmitter-receiver means (10) at an interrogating location and retroreflector means (40) at said remote interrogated location, said laser transmitter-receiver means (10) comprising a laser transmitter section (20) including laser transmitter means (23, 24, 25, 26) including a semiconductor laser (23) and wavelength stabilizing means as part of said semiconductor laser (23) for stabilizing the wavelength of said semiconductor laser (23) and an IFF-code generator means (21) operatively connected to said laser transmitter means for modulating a laser beam (11) transmitted by said laser transmitter means (23, 24, 25, 26), said laser transmitter-receiver means further comprising a laser receiver section (30) including laser receiver means (31, 32, 33, 34, 35), an IFF-code demodulator (37) and first control means (12) connected to said IFF-code demodulator (37) and to said laser transmitter means for controlling the laser transmitter means in accordance with received information, said laser receiver section (30) further comprising transducer means (38) connected to said IFF-code demodulator (37) for providing an information output, said retroreflector means (40) comprising a retroreflector section and means including an IFF-monitoring circuit for fully activating said retroreflector section only in response to a transmitted laser beam (11) modulated with an IFF-code and for fully deactivating said retroreflector section in response to a foe laser interrogation, information sensing means (61) for sensing information at said remote location, a retroreflector (64), and liquid crystal reflector modulator means (62) arranged for modulating a reflected beam (41) in response to information sensed by said information sensing means (61) at said remote location, said semiconductor laser (23) and said liquid crystal reflector modulator means (62) requiring a low voltage, low current power supply, said IFF-monitoring circuit for fully activating said retroreflector section comprising a laser receiver (51), an interference filter (52) connected to an input of said laser receiver (51), said interference filter (52) having a narrow band corresponding to a wavelength band of said laser transmitter means, reception optics (53) cooperating with said interference filter (52), a photo-detector (54) connected to said reception optics, an amplifier (55) connected to said photo-detector (54), and an IFF-code filter (56) connected to said amplifier (55), said activating means including further control means (42) connected with one input to said IFF-code filter (56) for monitoring the output of said IFF-code filter (56) and for activating the retroreflector section (60) including said information sensing means, amplifier means (65) and said reflector modulator means (62) in the form of said liquid crystal reflector modulator means, in response to a signal received by said IFF-monitoring circuit.

27. A remote data monitoring system for interrogating information from a remote interrogated location, comprising laser transmitter-receiver means (10) at an interrogating location and retroreflector means (40 at said remote interrogated location, said laser transmitter-receiver means (10) comprising a laser transmitter section (20) including laser transmitter means (23, 24, 25, 26) including a semiconductor laser (23) and wavelength stabilizing means as part of said semiconductor laser (23) for stabilizing the wavelength of said semiconductor laser (23) and an IFF-code generator means (21) operatively connected to said laser transmitter means for modulating a laser beam (11) transmitted by said laser transmitter means (23, 24, 25, 26), said laser transmitter-receiver means further comprising a laser receiver section (30) including laser receiver means (31, 32, 33, 34, 35), an IFF-code demodulator (37) and first control means (12) connected to said IFF-code demodulator (37) and to said laser transmitter means for controlling the laser transmitter means in accordance with received information, said laser receiver section (30) further comprising transducer means (38) connected to said IFF-code demodulator (37) for providing an information output, said retroreflector means (40) comprising a retroreflector section and means including an IFF-monitoring circuit for fully activating said retroreflector section only in response to a transmitted laser beam (11) modulated with an IFF-code and for fully deactivating said retroreflector section in response to a foe laser interrogation, information sensing means (61) for sensing information at said remote location, a retroreflector (64), and liquid crystal reflector modulator means (62) arranged for modulating a reflected beam (41) in response to information sensed by said information sensing means (61) at said remote location for simultaneously transmitting information containing signals and IFF-code modulated signals, said semiconductor laser (23) and said liquid crystal reflector modulator means (62) requiring a low voltage, low current power supply, wherein said liquid crystal reflector modulator means (62) comprise a liquid crystal mixture, said system further comprising means for modulating the drive or activation voltage for said liquid crystal mixture in said liquid crystal modulator, said liquid crystal mixture exhibiting a two frequency characteristic, said modulator means performing an amplitude modulation or performing a frequency modulation of said drive or activation voltage at different times.

28. A remote data monitoring system for interrogating information from a remote interrogated location, comprising laser transmitter-receiver means (10) at an interrogating location and retroreflector means (40) at said remote interrogated location, said laser transmitter-receiver means (10) comprising a laser transmitter section (20) including laser transmitter means (23, 24, 25, 26) including a semiconductor laser (23) and wavelength stabilizing means as part of said semiconductor laser (23) for stabilizing the wavelength of said semiconductor laser (23) and an IFF-code generator means (21) operatively connected to said laser transmitter means for modulating a laser beam (11) transmitted by said laser transmitter means (23, 24, 25, 26), said laser transmitter-receiver means further comprising a laser receiver section (30) including laser receiver means (31, 32, 33, 34, 35), an IFF-code demodulator (37) and first control means (12) connected to said IFF-code demodulator (37) and to said laser transmitter means for controlling the laser transmitter means in accordance with received information, said laser receiver section (30) further comprising transducer means (38) connected to said IFF-code demodulator (37) for providing an information output, said retroreflector means (40) comprising a retroreflector section and means including an IFF-monitoring circuit for fully activating said retroreflector section only in response to a transmitted laser beam (11) modulated with an IFF-code and for fully deactivating said retroreflector section in response to a foe laser interrogation, information sensing means (61) for sensing information at said remote location, a retroreflector (64), and liquid crystal reflector modulator means (62) arranged for modulating a reflected beam (41) in respone to information sensed by said information sensing means (61) at said remote location for simultaneously transmitting information containing signals and IFF-code modulated signals, said semiconductor laser (23) and said liquid crystal reflector modulator means (62) requiring a low voltage, low current power supply, and further comprising a target acquisition and tracking arrangement (24) including zoom transmission optics (25) and a beam control member (26), when during a target acquisition phase, said control means (12) control said zoom transmission optics (25) of said target acquisition and tracking arrangement (24) for setting the transmitted laser beam (11) to a large divergence, for said first control means (12) also controlling said beam control member (26) for performing a search mode, in which the transmitted laser beam (11) is scanning a predetermined space sector, and wherein after the first detection of a reflected laser beam (41), said control means (12) initiates a target tracking phase by setting said zoom transmission optics (25) to the smallest possible divergence of the transmitted laser beam (11) and by controlling said beam control member (26) for maximizing the intensity of the reflected laser geam (41).

29. The system of claim 28, further comprising first frequency shifter means (66) connected to the output of said information sensing means (61), whereby said first frequency shifter means (66) shifts the frequency band which is to be transmitted by reflection, by about 1 kHz to a higher frequency, and second frequency shifter means (39) coupled to an input of said transducer means (38), whereby said second frequency shifter means (39) correspondingly shifts back the frequency band, which was transmitted by reflection.

30. The system of claim 28, wherein said laser transmitter section (20) comprises laser beam controller means (26) including two motor-driven rotating optical wedge compensators (260) for directing the laser beam.

* * * * *